US012657319B2

(12) United States Patent
Samuel et al.

(10) Patent No.: US 12,657,319 B2
(45) Date of Patent: Jun. 16, 2026

(54) ADJUSTING SUBSYSTEM DATA EXPIRATION DURATION

(71) Applicant: DELL PRODUCTS L.P., Round Rock, TX (US)

(72) Inventors: Balasingh Samuel, Round Rock, TX (US); Nikhil Vichare, Austin, TX (US); Travis North, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 120 days.

(21) Appl. No.: 18/592,382

(22) Filed: Feb. 29, 2024

(65) Prior Publication Data

US 2025/0278500 A1     Sep. 4, 2025

(51) Int. Cl.
*G06F 21/62* (2013.01)

(52) U.S. Cl.
CPC ................................ *G06F 21/6209* (2013.01)

(58) Field of Classification Search
CPC .................................................. G06F 21/6209
See application file for complete search history.

(56) References Cited

U.S. PATENT DOCUMENTS

| | | | | |
|---|---|---|---|---|
| 2008/0247313 A1* | 10/2008 | Nath | ........................ | H04Q 9/00 370/231 |
| 2011/0078108 A1* | 3/2011 | Kumar | ................ | G06F 11/3006 707/E17.037 |
| 2019/0354484 A1* | 11/2019 | Marshall | ............. | G06F 12/0811 |
| 2022/0141079 A1 | 5/2022 | Samuel et al. | | |
| 2022/0237061 A1 | 7/2022 | Sethi et al. | | |
| 2022/0269543 A1 | 8/2022 | Samuel et al. | | |
| 2022/0377149 A1 | 11/2022 | Vichare et al. | | |
| 2023/0142028 A1* | 5/2023 | Cheng | .................... | H04L 43/16 709/224 |

* cited by examiner

*Primary Examiner* — Vance M Little
(74) *Attorney, Agent, or Firm* — Larson Newman, LLP

(57) ABSTRACT

An information handling system retrieves a data expiration policy in response to receiving a request from an application, and determines a data expiration value of a data type based on the data expiration policy. If the cached data is not expired based on the data expiration value, then the system collects data from a source based on the request and transmits the data with a response to the application.

20 Claims, 4 Drawing Sheets

100

Information Handling System

102 Processor

104 Processor

134 Video Display

120 Memory 110   106

108

130   136

122

Chipset

132

Graphics Interface

112

140 NVRAM
142 BIOS/ EFI

170 I/O Interface

150 Disk Controller

192

156

152

176 TPM

180 Network Interface

172

174 Add-On Resource

ODD

HDD

182

154

190 BMC

160 Disk Emulator

194

164   162

Solid State Drive

400

| Identifier 405 | Data Type 410 | Data Expiration 415 | Interface Speed 420 |
|---|---|---|---|
| 001 | Battery | 15 minutes | Slow |
| 002 | Fan | 30 seconds | Slow |
| 003 | Joint Temperature | 15 seconds | Fast |
| 004 | Skin Temperature | 30 seconds | Medium |

ADJUSTING SUBSYSTEM DATA EXPIRATION DURATION

FIELD OF THE DISCLOSURE

The present disclosure generally relates to information handling systems, and more particularly relates to adjusting subsystem data expiration duration.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

An information handling system retrieves a data expiration policy in response to receiving a request from an application, and determines a data expiration value of a data type based on the data expiration policy. If the cached data is not expired based on the data expiration value, then the system collects data from a source based on the request and transmits the data with a response to the application.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NVRAM 140, disk controller 150, and I/O interface 170 are connected to chipset 110 via an I/O channel 112. An example of I/O channel 112 includes one or more point-to-point PCIe links between chipset 110 and each of NVRAM 140, disk controller 150, and I/O interface 170. Chipset 110 can also include one or more other I/O interfaces, including a PCIe interface, an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. NVRAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board, or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device, a BMC may be referred to as an embedded controller (EC). A BMC included in a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a PCIe interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NVRAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor defined interfaces (such as a Dell EMC Remote Access Controller Administrator (RACADM) utility, a Dell EMC OpenManage Enterprise, a Dell EMC OpenManage Server Administrator (OMSA) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC, or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NVRAM associated with the BMC. Information stored in the RAM may be lost after power-down of the power plane for BMC 190, while information stored in the NVRAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple central processing units (CPUs) and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

Periodic collection of subsystem data at a predefined fixed or policy-based frequency may negatively impact system performance. For example, instrumenting platform-level data for the data collection requires CPU cycles and I/O access, which can also negatively impact system performance. In addition, the data collection itself typically requires additional energy which reduces the performance of other workloads. Further, this issue gets elevated when the data is collected via restricted access interfaces, such as via a system management interface (SMI) or an interface used by trust zone security methods. For example, the SMI typically stops the execution of a current workload to process data instrumentation requests, such as requests for battery data, thermal data, fan data, etc. In addition, security initiatives typically add more constraints to extract platform data. For example, zero trust security initiative requires running cryptographic authentication for each data extracted. Thus, there is a need to improve the current telemetry system and method by optimizing the data collection mechanism by reducing I/O access and executions of the restricted access interfaces. This may decrease the negative impact on the performance of the system. Accordingly, the present disclosure provides a system and method for optimizing the data collection by adjusting subsystem data expiration duration based on one or more criteria. For example by adjusting the subsystem data expiration, also referred to as data tolerance, the present disclosure can reduce the I/O access and the aforementioned executions.

Figure 2:
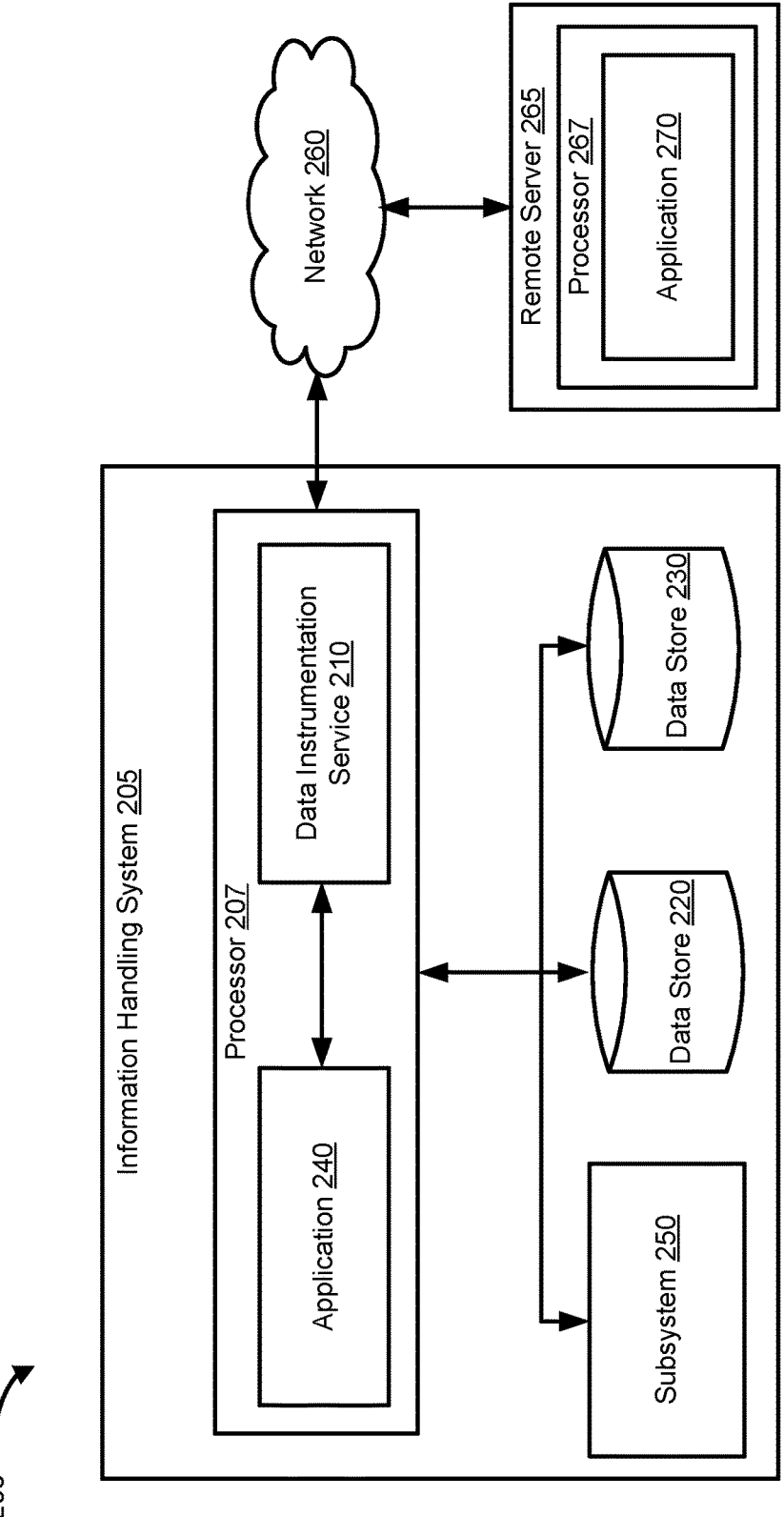
FIG. 2 is a block diagram of a telemetry system, according to an embodiment of the present disclosure.

FIG. 2 shows a portion of a telemetry system 200, according to at least one embodiment of the present disclosure. Telemetry system 200 includes an information handling system 205, a network 260, and a remote server 265 that includes a processor 267 and an application 270. Information handling system 205, which is similar to information handling system 100 of FIG. 1, includes a processor 207, data stores 220 and 230, and subsystem 250. Processor 207 includes an application 240 and a data instrumentation service 210. Data instrumentation service 210 may be communicatively coupled to application 240, subsystem 250, and data stores 220 and 230. Data instrumentation service 210 may also be communicatively coupled to application 270 via network 260. The components of telemetry system 200 may be implemented in hardware, software, firmware, or any combination thereof.

The components shown are not drawn to scale and telemetry system 200 may include additional or fewer components. For example, information handling system 205 may include more than one subsystem or application. Data instrumentation service 210 may also be communicatively coupled to more than one remote application via network 260. Processor 207, which is similar to processor 102 or 104 of FIG. 1, may perform any suitable operations to execute data instrumentation service 210 and application 240. The operations described herein as being performed by data instrumentation service 210 or application 240 may be performed or executed by processor 207. Similarly, processor 267 may perform any suitable operations to execute application 270. In addition, connections between components may be omitted for descriptive clarity.

Data instrumentation service 210, also referred to as a telemetry service, may be configured to collect and/or receive telemetry data from one or more sources like devices, peripherals, and subsystems, such as subsystem 250. In particular, data instrumentation service 210 may collect and/or receive telemetry data from one or more sensors of the subsystems. The subsystems may include a processing subsystem, a storage subsystem, a management subsystem, a power subsystem, a cooling subsystem, a thermal subsystem, etc. Each subsystem may be configured to report its health along with other information to one or more applications via data instrumentation service 210. In one example, subsystem 250 may include a battery management unit.

Data instrumentation service 210 may also collect and/or receive telemetry data for one or more applications, such as applications 240 and 270. These applications may be manufacturer applications, third-party applications, or similar that may be configured to manage, monitor, and/or control an information handling system and/or its subsystems. In this example, application 240 may be locally installed while application 270 may be installed in remote server 265. In one example, application 270 may be a cloud service and is communicatively coupled to data instrumentation service 210 via network 260. In certain embodiments, network 260 may be a public network, such as the Internet, a physical private network, a wireless network, a virtual private network (VPN), or any combination thereof.

In addition, data instrumentation service 210 may retrieve telemetry data stored in data store 230. Data store 230 may be used to store the cached data may be stored in various formats, such as a file, a table, a list, etc. The cached data may also be stored in an NVRAM or a database. The database may be stored in a drive similar to HDD 154, ODD 156, and SSD 164 of FIG. 1. The telemetry data may also be referred to as cached telemetry data or simply cached data, which has been collected from one or more subsystems. Data instrumentation service 210 may collect and/or receive the telemetry data, also referred to herein simply as data, according to one or more policies, such as a data expiration policy. The policies may be stored in a data store, such as data store 220.

The telemetry data associated with each subsystem may have a default data expiration value, also referred to as a default data tolerance value. However, a system engineer or administrator of information handling system 200 can also define the data expiration value for each data set, also referred to herein as a data type, via the data expiration policy. The data expiration mechanism allows for setting an expiration interval on how long a particular telemetry data is valid or relevant, which may be based on a timestamp when the telemetry data was collected or received. As such, when the telemetry data expires, new data may be collected and/or received. The data expiration value may be a period in seconds, microseconds, minutes, etc. Each data type may have a different data expiration period. For example, battery data may have a longer data expiration duration than thermal data. In a particular example, battery health data may be read every 15 minutes while skin temperature data may be read every 30 seconds.

The data expiration policy may include information associated with the data expiration for each data type, interface speed, etc. This information may be stored locally or remotely in a data store, such as data store 220. Further, the information may be stored in various formats, such as a list, a table, a file, etc. that can be accessed by data instrumentation service 210. For example, the data expiration policy may include a table 400 of FIG. 4. The data expiration value in the data expiration policy may be updated continually or periodically based on several criteria such as subsystem health, I/O interface speed, energy requirement to instrument the data, user presence detection, etc. One skilled in the art may appreciate that other criteria or a combination of one or more criteria may be utilized without limitation on the scope or applicability of the present disclosure.

One of the criteria for adjusting the data expiration value of the subsystem data can be based on the health of the associated subsystem, wherein the subsystem data is the telemetry data for the subsystem. The health status of the subsystem may be based on one or more factors, such as a percentage threshold associated with its state of health, number of software or event failures being reported, health status report from a BMC, etc. For example, subsystem 250 may be deemed healthy if a battery associated with subsystem 250 is healthy or if the state of health of subsystem 250 is equal to or greater than the percentage threshold. The subsystem may also be deemed healthy if there is no failure event reported. Accordingly, the subsystem may be deemed unhealthy if its state of health is less than the percentage threshold. The subsystem may also be deemed unhealthy if there is at least one failure event reported. If the subsystem is deemed in a healthy state, then the data expiration value of the data type associated with the subsystem may have a longer duration. This is because reading the data at a higher frequency when the subsystem is healthy may not provide additional value. Accordingly, if the subsystem is deemed unhealthy, then the data expiration may have a shorter duration to allow closer monitoring of the subsystem.

The data expiration value of subsystem data may be adjusted based on an I/O interface speed used to transmit the subsystem data according to a threshold. For example, the I/O interface may be deemed slow if its speed is below a threshold. Otherwise, the I/O interface may be deemed fast. If the I/O interface speed is deemed slow, then the data expiration duration may be increased. This may be done because of longer latencies when collecting data due to the slow I/O interface. Accordingly, if the I/O interface speed is deemed fast, then the data expiration duration may be retained or decreased.

The data expiration of subsystem data may be adjusted based on energy requirements to instrument the subsystem data. For example, if the energy required to collect or instrument the subsystem data is greater than a threshold, then the data expiration duration may be increased. Accordingly, if the energy required to collect or instrument the subsystem data is less than or equal to the threshold, then the data expiration duration may be retained or decreased.

The data expiration of a subsystem data may be adjusted based on whether user presence is detected indicating that a user is near an information handling system. For example, the user presence may be detected based on whether human movement has been detected near the information handling system, a human voice having a location in front of a video display of the information handling system has been detected, an I/O interface associated with the information handling system has been moved, and/or the position of the information handling system has changed, which indicates that the user has picked up or moved the information handling system, such as a laptop or tablet computer. For example, if user presence is detected, then the data expiration value may be increased. This would allow the subsystem or the information handling system to accommodate requests from the user if any. Accordingly, if user presence is not detected, then the data expiration value may be retained or decreased. This would allow data instrumentation service 210 to take advantage of a possible lull in user requests and collect the telemetry data.

Data instrumentation service 210 may be configured to determine whether the telemetry data requested is to be instrumented and/or collected from a device/subsystem or returned from a data store based on a data expiration policy. The determination may be based on whether the subsystem data request is from a local or remote application, such as a cloud-based telemetry service. For example, if the subsystem data request is from a local application, then the data instrumentation service may collect the data from the device or the subsystem instead of returning cached data from a database or a data store, such as data store 230, except when the cached data is expired.

For example, if the request for the subsystem data is from a locally installed application, such as application 240, then data instrumentation service 210 may collect the data from subsystem 250. This is because the cost to transmit the system data to application 240 is lower, wherein data transmission cost includes bandwidth utilization, energy usage, etc. Accordingly, if the request for the subsystem data is from a remote application, such as application 270, then data instrumentation service 210 may return cached data from data store 230. This is because the cost to transmit the subsystem data to application 270 may be higher. However, data instrumentation service 210 may do this if the cached data has not yet expired. If the cached data is expired, then data instrumentation service 210 may collect the subsystem data from subsystem 250.

Further, the determination of whether to collect the data from the subsystem or to return cached data may also be based on an application usage context. For example, if the application is requesting the subsystem data to determine the health of the subsystem, then the data expiration value may be increased. In another example, if the application requests the subsystem data to calculate the subsystem's current performance to optimize certain workloads, then the data expiration duration may be retained or decreased. Similarly, if the application is requesting the subsystem data for security issues, such as with the zero trust security initiative, then the data expiration duration may also be retained or decreased. In a particular example, if application 240 requests data instrumentation service 210 for subsystem data associated with subsystem 250 to determine the health of subsystem 250, then the data expiration value of the subsystem data may be increased.

Those of ordinary skill in the art will appreciate that the configuration, hardware, and/or software components of telemetry system 200 depicted in FIG. 2 may vary. For example, the illustrative components within telemetry system 200 are not intended to be exhaustive but rather are representative to highlight components that can be utilized to implement aspects of the present disclosure. For example, other devices and/or components may be used in addition to or in place of the devices/components depicted. The depicted example does not convey or imply any architectural or other limitations with respect to the presently described embodiments and/or the general disclosure. In the discussion of the figures, reference may also be made to components illustrated in other figures for continuity of the description.

Figure 3:
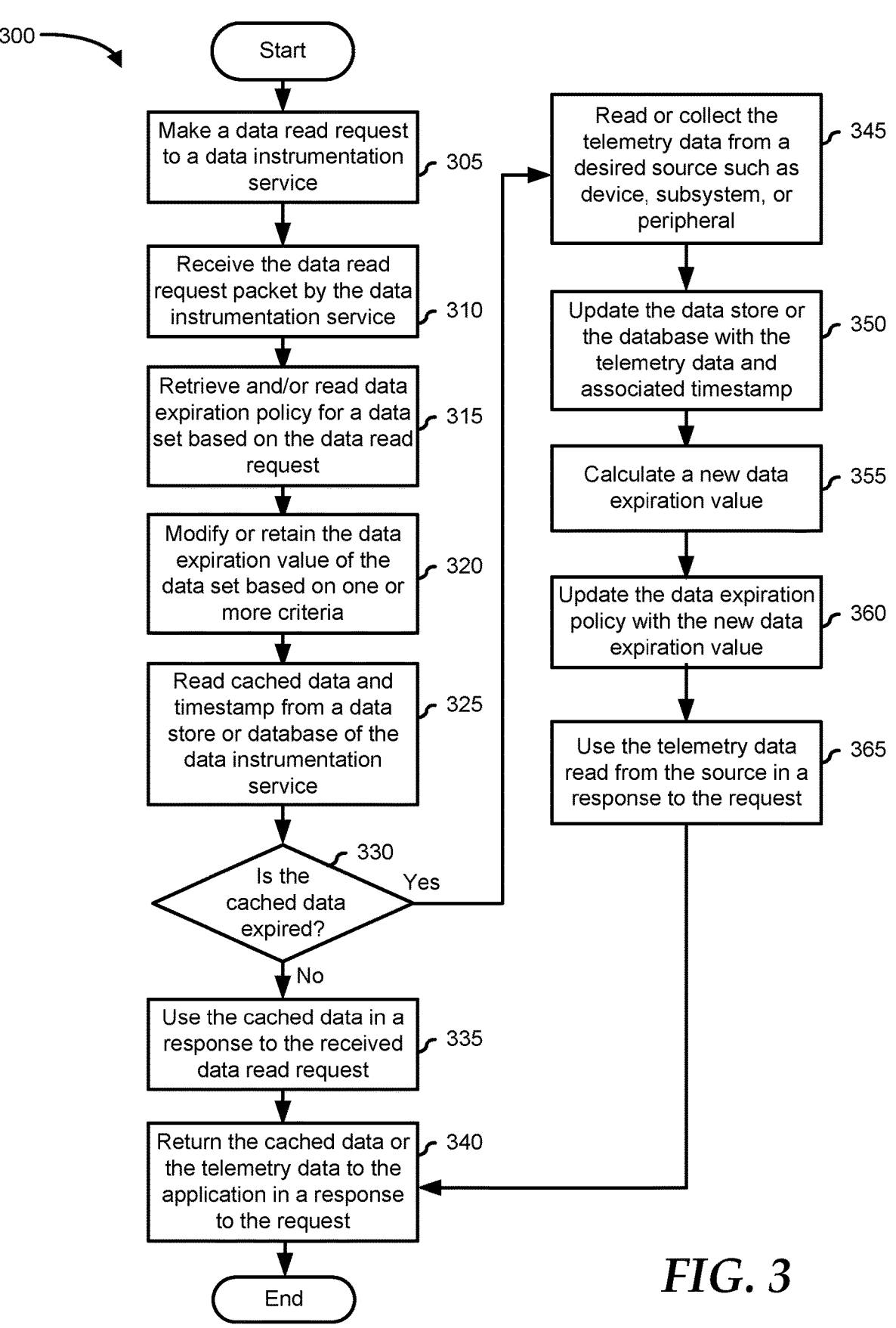
FIG. 3 is a flowchart of a method for adjusting subsystem data expiration duration, according to an embodiment of the present disclosure.

FIG. 3 shows a flowchart of a method 300 for adjusting subsystem data expiration duration. Method 300 may be performed by any suitable component of telemetry system 200 of FIG. 2 including, but not limited to, data instrumentation service 210 and applications 240 and 270. While embodiments of the present disclosure are described in terms of the components of telemetry system 200, it should be recognized that other components may be utilized to perform the described method.

Method 300 typically starts at block 305 where a data read request may be transmitted by an application, such as application 240 or application 270. The data request may be a periodic read request or a simple read request, such as a one-off data request associated with a device, peripheral, subsystem, or similar. Method 300 proceeds to block 310 where the data read request from the application may be received by data instrumentation service 210. The data read request may include information associated with the usage context of the request, such as whether the request is for a health report or workload optimization, among others. In one example, the data read request may include a usage context identifier. The application may have registered with data instrumentation service 210 prior to the data read request, wherein the application has provided information, such as context, priority, preferred data tolerance value, etc. for one or more usage context identifiers. The information may be stored in a lookup table along with the data expiration policy at data store 220.

Method 300 proceeds to block 315, where data instrumentation service 210 may retrieve and/or query a data expiration policy to determine information such as interface speed and data expiration value associated with the data type or specific data set according to the data read request. The data expiration policy may be retrieved from a database or a data store, such as data store 220. Method 300 proceeds to block 320 where data instrumentation service 210 may determine whether to modify or retain the current data expiration value of the data type based on one or more criteria, such as the application usage context. If data instrumentation service 210 determines to modify the data expiration value of the data type or the specific data set requested, then it may calculate a new or modified data expiration value. The new or modified data expiration value may be longer or shorter than the current data expiration value. In particular, data instrumentation service 210 may add or subtract a length of time from the data expiration value. However, data instrumentation service 210 may determine that data expiration value may not be modified, that is the value may be retained.

The method proceeds to block 325 where data instrumentation service 210 may read the data and timestamp of the data from a non-volatile memory, a database, or a data store, such as data store 230. The memory, database, and data store may also serve as a cache for the telemetry data that was received or collected earlier. As such, the data read may also be referred to as cached data. A timestamp associated with the cached data may be used to determine when the data was received or collected. In addition, the timestamp may be used to determine whether the data is expired.

The method proceeds to decision block 330 where data instrumentation service 210 may use the timestamp of the cached data to determine if the cached data is expired. The cached data may be deemed expired if (current time less the cached data timestamp) is greater than the modified data expiration value that was calculated at block 320. If the data expiration value was not modified, then the cached data may be deemed expired if (current time less the cached data timestamp) is greater than the data expiration value. If the cached data is expired, then the "YES" branch is taken, and the method proceeds to block 345. If the cached data is not expired, then the "NO" branch is taken, and the method proceeds to block 335. At block 335, data instrumentation service 210 may use the cached data instead of reading or collecting the telemetry data from the source in response to the request. Data instrumentation service 210 may format the cached data prior to transmitting a response. The method proceeds to block 340 where data instrumentation service 210 may transmit the response to the application that made the request. The response may include either the cached data or the telemetry data. Afterwards, the method ends.

At block 345, data instrumentation service 210 may read or collect the telemetry data from the source, such as the subsystem, device, or peripheral based on the received read request from the application. The method proceeds to block 350 where data instrumentation service 210 may update the cached data and timestamp in the database or the data store, such as data store 230 with the current telemetry data and associated timestamp from block 345. The method proceeds to block 355 where data instrumentation service 210 may calculate a new data expiration value for the data set or data type associated with the data read request based on one or more criteria. The method proceeds to block 360 where data instrumentation service 210 may update the data expiration value in the data expiration policy with the new data expiration duration. The method proceeds to block 365 where data instrumentation service 210 may use the telemetry data from the source in a response to the request. Data instrumentation service 210 may format the telemetry data prior to transmitting a response. The method proceeds to block 340.

Figure 4:
FIG. 4 is a table showing a data expiration policy, according to an embodiment of the present disclosure.

FIG. 4 shows table 400 of a data expiration policy, according to at least one embodiment of the present disclosure. Table 400 includes one or more columns, such as an identifier 405, a data type 410, a data expiration 415, and an interface speed 420. Identifier 405 may be a unique identifier for each data type. Data type 410 may indicate a particular data type or data set that may be collected by data instrumentation service 210. The data type may be based on the source of the telemetry data. For example, a battery data type may indicate the type of telemetry data collected from a battery subsystem, such as from a battery management unit. A fan data type may indicate the type of telemetry data collected from a fan subsystem. While there are four data types included in table 400, one of ordinary skill in the art would recognize that table 400 would include any suitable number of data types without varying from the scope of this disclosure.

Data expiration 415 may include a data expiration value for each data type. The data expiration value may indicate the duration for how long the telemetry data that was read or collected remains to be valid. As such, data expiration value may indicate the frequency of collecting that particular data type. Typically, at the expiration of the telemetry data, data instrumentation service 210 of FIG. 2 may read or collect the telemetry data associated with the data type from the source. Data instrumentation service 210 may have access to information regarding the source for each data type. For example, data instrumentation service 210 may collect battery data type from the battery management unit every 15 minutes.

Interface speed 420 may indicate the speed of the interface used to read or collect the telemetry data from the source. The interface speed may be used by data instrumentation service as one of the criteria in determining whether to read or collect telemetry data from the source or use the cached data. The interface speed may also be used by data instrumentation service 210 to determine whether to modify the data expiration value associated with the data type or data set. Table 400 may also include additional columns with information that may be used by the data instrumentation service as criteria to perform an action, such as whether to update the data expiration value or whether to return cached data instead of reading/collecting the telemetry data from the source. A systems engineer and/or administrator may indicate whether the interface speed is fast, slow, or medium. For example, a threshold may be set for the fast, slow, or medium speeds. For example, an interface with a 10 megabits per second (Mbps) may be classified as slow while an interface with 10,000 Mbps may be classified as fast.

Although FIG. 3 shows example blocks of method 300 in some implementations, method 300 may include additional blocks, fewer blocks, different blocks, or differently arranged blocks than those depicted in FIG. 3. Those skilled in the art will understand that the principles presented herein may be implemented in any suitably arranged processing system. Additionally, or alternatively, two or more of the blocks of method 300 may be performed in parallel. For example, blocks 320 and 325 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

When referred to as a "device," a "module," a "unit," a "controller," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCM-CIA) card, or other such expansion card), or a system (such as a motherboard, a system-on-a-chip (SoC), or a stand-alone device).

The present disclosure contemplates a computer-readable medium that includes instructions or receives and executes instructions responsive to a propagated signal; so that a device connected to a network can communicate voice, video, or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes, or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:

retrieving, by a processor, a data expiration policy in response to receiving a data read request from an application;

in response to receiving the data read request, determining whether to modify or retain a data expiration value of a data type associated with the data read request based on an application usage context;

in response to determining to modify the data expiration value, modifying on the data expiration value of the data type in the data expiration policy based on the application usage context;

subsequent to the modifying of the data expiration value of the data type, retrieving cached data of the data type based on the data read request received from the application; and if the cached data is not expired based on a modified data expiration value, then transmitting the cached data with a response to the application.

2. The method of claim 1, wherein the modifying of the data expiration value of the data type is based on the application usage context of the data read request.

3. The method of claim 1, further comprising determining whether to modify the data expiration value associated with the data type.

4. The method of claim 1, wherein the cached data includes a timestamp.

5. The method of claim 1, further comprising determining whether the cached data is expired.

6. The method of claim 5, further comprising if the cached data is expired, then collecting telemetry data from a source based on the data read request.

7. The method of claim 6, further comprising transmitting the response with the telemetry data to the application.

8. The method of claim 6, further comprising updating the cached data with the telemetry data from the source.

9. An information handling system, comprising:

a memory to store a data expiration policy; and a processor to communicate with the memory, the processor to:

retrieve the data expiration policy in response to receiving a data read request from an application;

determine a data expiration value of a data type based on the data expiration policy, wherein the data type is according to the data read request received from the application;

in response to receiving the data read request, determining whether to modify or retain the data expiration value of the data type associated with the data read request based on an application usage context;

in response to determining to modify the data expiration value, modifying the data expiration value of the data type in the data expiration policy based on the application usage context;

subsequent to the modifying of the data expiration value of the data type, retrieving cached data of the data type based on the data read request received from the application;

if the cached data is expired based on a modified data expiration value, then collect data from a source based on the data read request; and transmit the data with a response to the application.

10. The information handling system of claim 9, wherein the processor is further configured to determine whether to modify the data expiration value associated with the data type.

11. The information handling system of claim 9, wherein the processor is further configured to determine whether to retain the data expiration value associated with the data type.

12. The information handling system of claim 11, wherein the data expiration value of the data type is retained based on the application usage context of the data read request.

13. The information handling system of claim 9, wherein the data is collected from the source if the cached data associated with the data type is expired.

14. A non-transitory computer-readable medium to store instructions that are executable to perform operations comprising:

retrieving a data expiration policy in response to receiving a data read request from an application;

in response to receiving the data read request, determining whether to modify or retain a data expiration value of a data type associated with the data read request based on application usage context;

in response to determining to modify the data expiration value, modifying the data expiration value of the data type in the data expiration policy based on the application usage context;

subsequent to the modifying of the data expiration value of the data type, retrieving cached data based on the data read request;

if the cached data is expired according to a modified data expiration value, then collecting data from a source based on the data read request; and transmitting the data with a response to the application.

15. The non-transitory computer-readable medium of claim 14, wherein the modifying of the data expiration value of the data type is based on an application usage context of the data read request.

16. The non-transitory computer-readable medium of claim 14, wherein the operations further comprise determining whether to modify the data expiration value associated with the data type.

17. The non-transitory computer-readable medium of claim 14, wherein the operations further comprise determining whether the cached data is expired.

18. The non-transitory computer-readable medium of claim 14, wherein the operations further comprise if the cached data is not expired, then transmitting the cached data with the response to the application.

19. The non-transitory computer-readable medium of claim 18, wherein the cached data includes a timestamp.

20. The non-transitory computer-readable medium of claim 18, wherein the operations further comprise updating the cached data with the data from the source.

* * * * *